United States Patent
Jeong

(10) Patent No.: US 9,673,843 B2
(45) Date of Patent: Jun. 6, 2017

(54) FRONT END MODULE

(71) Applicant: SAMSUNG ELECTRO-MECHANICS CO., LTD., Suwon-Si (KR)

(72) Inventor: Chan Yong Jeong, Suwon-Si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 0 days.

(21) Appl. No.: 14/976,015

(22) Filed: Dec. 21, 2015

(65) Prior Publication Data

US 2016/0197629 A1 Jul. 7, 2016

(30) Foreign Application Priority Data

Jan. 6, 2015 (KR) .................. 10-2015-0001362

(51) Int. Cl.
*H04B 1/26* (2006.01)
*H04B 1/00* (2006.01)
*H04B 5/00* (2006.01)

(52) U.S. Cl.
CPC ......... *H04B 1/0064* (2013.01); *H04B 5/0025* (2013.01)

(58) Field of Classification Search
CPC ...... H04B 1/0057; H04B 1/406; H04B 1/525; H04B 7/26; H04B 1/005; H04B 1/0067; H04B 1/3805; H04B 1/0064

USPC ........................................................ 455/313
See application file for complete search history.

(56) References Cited

U.S. PATENT DOCUMENTS

| | | | | |
|---|---|---|---|---|
| 6,163,709 A | * | 12/2000 | Chorey | H04B 1/406 455/126 |
| 7,839,237 B2 | * | 11/2010 | Buer | H03H 11/20 333/103 |
| 2005/0197153 A1 | * | 9/2005 | Kim | H04B 1/0458 455/552.1 |
| 2005/0248402 A1 | | 11/2005 | Zhenbiao et al. | |
| 2013/0154889 A1 | * | 6/2013 | Desclos | H01Q 9/06 343/745 |
| 2014/0349592 A1 | * | 11/2014 | Okazaki | H04B 1/0057 455/75 |
| 2016/0134254 A1 | * | 5/2016 | Backes | H02J 7/025 343/861 |

FOREIGN PATENT DOCUMENTS

| | | |
|---|---|---|
| KR | 10-2005-0043525 A | 5/2005 |
| KR | 10-2012-0027588 A | 3/2012 |

\* cited by examiner

*Primary Examiner* — Ajibola Akinyemi
(74) *Attorney, Agent, or Firm* — NSIP Law

(57) ABSTRACT

A front end module including a first band amplifying processor configured to amplify signals in a first frequency band; a second band amplifying processor configured to amplify signals in a second frequency band; and a controller configured to output separate control voltages to the first and second band amplifying processors to control modes of the first and second band amplifying processors.

23 Claims, 4 Drawing Sheets

FRONT END MODULE

CROSS-REFERENCE TO RELATED APPLICATION

This application claims the benefit under 35 USC 119(a) of Korean Patent Application No. 10-2015-0001362 filed on Jan. 6, 2015, in the Korean Intellectual Property Office, the disclosure of which is incorporated herein by reference.

BACKGROUND

1. Field

The following description relates to a front end module.

2. Description of Related Art

In accordance with the development of a wireless communications technology, wireless communications technology has been used in various electronic devices. A front end is one technological element of wireless communications technology. A front end involves the amplifying or filtering of received signals and providing amplified or filtered signals. Recently, processing of various, or multiple, frequency bands using one front end circuit has been demanded.

The front end circuit for multiple frequency bands, as described above, performs amplification reception, bypass reception, and transmission for each frequency. Therefore, control voltages for controlling the front end circuit to perform any one of various modes such as amplification reception, bypass reception, and transmission are required. However, the number of control voltages is also increased in order to satisfy the various frequency bands. In addition, when the front end circuit is designed to use a significantly reduced number of control voltages, the front end circuit cannot simultaneously process a plurality of frequency bands.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a front end module is capable of performing front end processing on a plurality of frequencies using a significantly reduced number of control voltages. The front end module includes a first band amplifying processor configured to amplify signals in a first frequency band; a second band amplifying processor configured to amplify signals in a second frequency band; and a controller configured to output separate control voltages to the first and second band amplifying processors to control modes of the first and second band amplifying processors.

In another general aspect, a front end module includes a first band amplifying unit configured to amplify signals in a first frequency band, a second band amplifying processor configured to amplify signals in a second frequency band, and a controller configured to provide separate control voltages to the first and second band amplifiers to control modes of the first and second band amplifiers.

In another general aspect, a front end module includes a first band amplifying processor connected to a first antenna and amplifying or bypassing first reception signals in a first frequency band received through the first antenna, a second band amplifying processor connected to a second antenna and amplifying or bypassing second reception signals in a second frequency band received through the second antenna, and a controller providing separate control voltages to the first and second band amplifying processors to control the first and second band amplifying processors to amplify or bypass the signals.

Other features and aspects will be apparent from the following detailed description, the drawings, and the claims.

BRIEF DESCRIPTION OF DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent to one of ordinary skill in the art. The sequences of operations described herein are merely examples, and are not limited to those set forth herein, but may be changed as will be apparent to one of ordinary skill in the art, with the exception of operations necessarily occurring in a certain order. Also, descriptions of functions and constructions that are well known to one of ordinary skill in the art may be omitted for increased clarity and conciseness.

The features described herein may be embodied in different forms, and are not to be construed as being limited to the examples described herein. Rather, the examples described herein have been provided so that this disclosure will be thorough and complete, and will convey the full scope of the disclosure to one of ordinary skill in the art.

Figure 1:
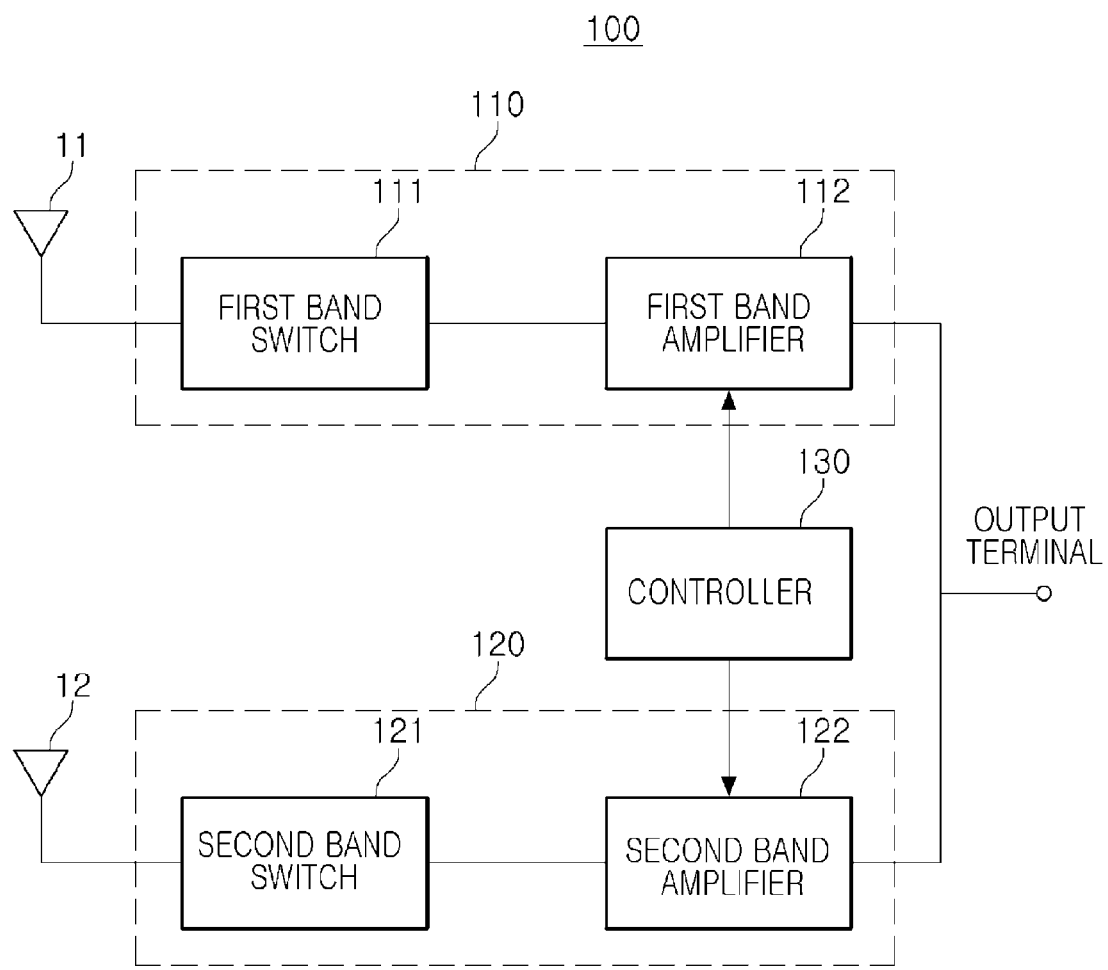
FIG. 1 is a block diagram illustrating an example of a front end module.

Referring to FIG. 1, the front end module 100 includes a first band amplifying processor 110, a second band amplifying processor 120, and a controller 130. The first band amplifying processor 110 amplifies signals in a first frequency band. The first band amplifying processor 110 is connected to a first antenna 11, and may amplify or bypass first reception signals in the first frequency band received through the first antenna 11 and provide the amplified or bypassed first reception signals to an output terminal. This operation of the first band amplifying processor 110 corresponds to a reception mode for the first frequency band.

The first band amplifying processor 110 provides first transmission signals in the first frequency band to the first antenna 11 to transmit signals in the first frequency band while in a transmission mode.

The second band amplifying processor 120 amplifies signals in a second frequency band. The second band amplifying processor 120 is connected to a second antenna 12, and may amplify or bypass second reception signals in the second frequency band received through the second antenna 12 and provide the amplified or bypassed second reception signals to the output terminal. This operation of the second band amplifying processor 120 corresponds to a reception mode for the second frequency band.

The second band amplifying processor 120 provides second transmission signals in the second frequency band to the second antenna 12 to transmit signals in the second frequency band while in a transmission mode.

For example, the second band amplifying processor 120 supports near field wireless communications in the second frequency band. The first frequency band may be a band of 5 GHz, and the second frequency band may be a band of 2.4 GHz. The first band amplifier supports Wi-Fi in the band of 5 GHz, and the second band amplifier supports Wi-Fi and Bluetooth in the band of 2.4 GHz. The controller 130 provides separate control voltages to the first and second band amplifying processors 110 and 120 to control modes of the first and second band amplifying processors 110 and 120. For example, the controller 130 controls the first and second band amplifying processors 110 and 120 to amplify or bypass signals. The controller 130 provides the separate control voltages to the first and second band amplifying processors 110 and 120. For instance, the controller 130 separately generates first control voltages for the first band amplifying processor 110 and second control voltages for the second band amplifying processor 120. The number of first control voltages are determined depending on the number of modes of the first band amplifying processor 110, and the number of second control voltages are determined depending on the number of modes of the second band amplifying processor 120.

Table 1 illustrates an example of generating control voltages without distinguishing the first and second frequency bands from each other.

TABLE 1

|  | VC4 | VC3 | VC2 | VC1 |
|---|---|---|---|---|
| BT | 1 | 0 | 0 | 0 |
| 5G_RX_LNA | 0 | 1 | 1 | 1 |
| 5G_RX_Bypass | 0 | 1 | 1 | 0 |
| — | 0 | 1 | 0 | 1 |
| 5G_TX | 0 | 1 | 0 | 0 |
| 2.4G_RX_LNA | 0 | 0 | 1 | 1 |
| 2.4G_RX_Bypass | 0 | 0 | 1 | 0 |
| 2.4G_TX | 0 | 0 | 0 | 1 |
| All off | 0 | 0 | 0 | 0 |

In Table 1, BT is a Bluetooth mode, 5 G_RX_LNA is a 5 G band reception mode in which amplification is made, 5 G_RX_Bypass is a 5 G reception bypass mode, and 5 G_TX is a 5 G band transmission mode. In addition, 2.4 G_RX_LNA is a 2.4 G band reception mode, 2.4 G_RX_Bypass is a 2.4 G reception bypass mode, and 2.4 G_TX is a 2.4 G band transmission mode. In Table 1, since a separate control voltage VC4 is used in the Bluetooth mode BT, four control voltages VC1 to VC4 are used in order to represent all of the above-mentioned modes. However, as seen in Table 1, the band of 5 GHz and the band of 2.4 GHz are not simultaneously operated in the four control voltages VC1 to VC4, because seven control voltages are required in order to satisfy a simultaneous operation of the band of 5 GHz and the band of 2.4 GHz. Additionally, since the four control voltages need to be provided to each of the first and second band amplifying processors 110 and 120, the first and second band amplifying processors 110 and 120 also need to receive the four control voltages. Therefore, the number of required switching terminals needs to be four or more.

Tables 2 and 3 illustrate another example of generating control voltages for each of the first and second frequency bands.

TABLE 2

|  |  | VC4 | VC3 | VC2 | VC1 |
|---|---|---|---|---|---|
| 2.4 G | RX_LNA | 1 | 1 | — | — |
| 2.4 G | RX_BP | 1 | 0 | — | — |
| 2.4 G | TX | 0 | 1 | — | — |
| 2.4 G | BT | 0 | 0 | — | — |
| 5 G | RX_LNA | — | — | 1 | 1 |
| 5 G | RX_BP | — | — | 1 | 0 |
| 5 G | TX | — | — | 0 | 1 |
| 5 G | All off | — | — | 0 | 0 |

TABLE 3

|  |  | VC4 | VC3 | VC2 | VC1 |
|---|---|---|---|---|---|
| 2.4 G | RX_LNA | 1 | 1 | — | — |
| 2.4 G | RX_BP | 1 | 0 | — | — |
| 2.4 G | TX | 0 | 1 | — | — |
| 2.4 G | BT | 0 | 0 | — | — |
| 5 G | TX | — | — | 1 | 1 |
| 5 G | TX | — | — | 1 | 0 |
| 5 G | RX_LNA | — | — | 0 | 1 |
| 5 G | RX_BP | — | — | 0 | 0 |

Referring to Tables 2 and 3, two control voltages are used in each of the first frequency band (5 GHz) and the second frequency band (2.4 GHz). In this example, the controller 130 generates first and second control voltages for distinguishing amplification and bypass of the first reception signals from the transmission of the first transmission signals of the first band amplifying processor 110. The controller 130 further generates third and fourth control voltages for distinguishing amplification and bypass of the second reception signals, transmission of the second transmission signals, and near field wireless communications in the second frequency band of the second band amplifying processor 120 from each other.

In a case of an example illustrated in Tables 2 and 3, the controller 130 adjusts a mode of the first band amplifying processor 110 using first and second control voltages VC1 and VC2, and adjusts a mode of the second band amplifying processor 120 using third and fourth control voltages VC3 and VC4. As illustrated in Tables 2 and 3, the mode of the first band amplifier includes a first band frequency reception mode 5 G RX_LNA, a first band frequency reception bypass mode 5 G RX_BP, and a first band frequency transmission mode 5 G TX.

In addition, the mode of the second band amplifier includes a second band frequency reception mode 2.4 G RX_LNA, a second band frequency reception bypass mode 2.4 G RX_BP, a second band frequency transmission mode 2.4 G TX, and a second band near field transmission and reception mode 2.4 G BT.

Figure 2:
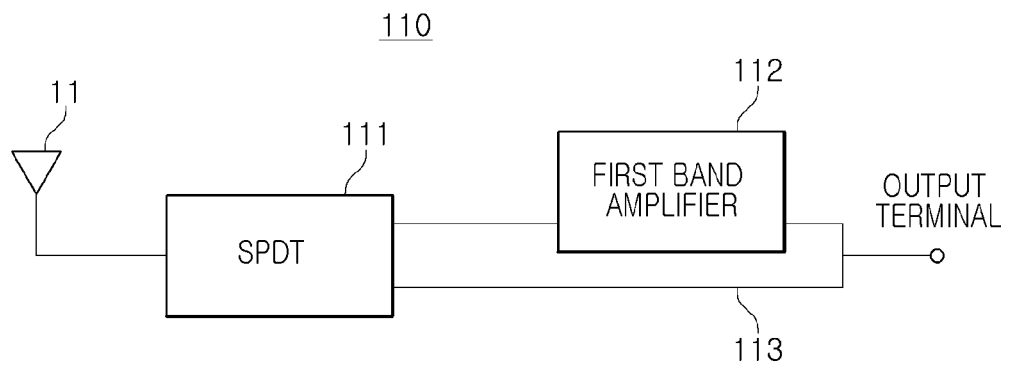
FIG. 2 is a block diagram illustrating an example of a first band amplifier illustrated in FIG. 1.

FIG. 2 is a block diagram illustrating an example of a first band amplifier illustrated in FIG. 1.

Referring to FIG. 2, the first band amplifying processor 110 includes a first band switch 111 and a first band amplifier 112. The first band switch 111 may be a single-pole double-throw (SPDT) switch receiving the control voltage and connecting one of first and second output paths to an input path depending on the control voltage. Here, the input path is connected to the first antenna 11 operated in the first frequency band. The first band amplifier 112 is positioned on the first output path, and the second output path is a bypass path 113 on which an amplifier is not present. The first and second output paths are connected to the output terminal. In the first band frequency reception mode, the SPDT switch 111 connects the first output path to the input path. Therefore, in a case in which the first output path is activated, the reception signals is amplified by the first band amplifier 112 and output to the output terminal. In other words, the SPDT switch 111 connects the first antenna 11 to the output terminal through the first output path and first band amplifier 112. Additionally, in the first band frequency reception bypass mode and the first band frequency transmission mode, the SPDT switch 111 connects the second output path and the input path to each other. Therefore, in a case in which the second output path is activated, the reception signals bypass the first band amplifier 112, without being amplified, and are output to the output terminal, or the transmission signals are output to the antenna. In other words, the SPDT switch 111 connects the first antenna 11 to the output terminal through the second output path 113.

Figure 3:
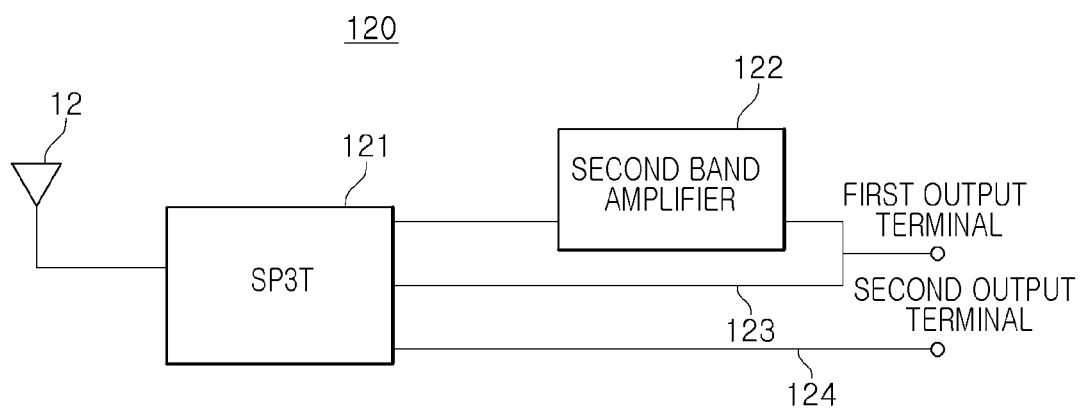
FIG. 3 is a block diagram illustrating an example of a second band amplifier illustrated in FIG. 1.

FIG. 3 is a block diagram illustrating an example of a second band amplifier illustrated in FIG. 1.

Referring to FIG. 3, the second band amplifying processor 120 includes a second band switch 121 and a second band amplifier 122. The second band switch 121 may be a single-pole 3-throw (SP3T) switch receiving the control voltage and connecting any one of first to third output paths to an input path according to the control voltage. Here, the input path is connected to the second antenna 12 operated in the second frequency band.

In the second band frequency reception mode, the SP3T switch 121 connects the first output path to the input path. The second band amplifier 122 is disposed on the first output path. Therefore, in a case in which the first output path is activated, the reception signals are amplified and are provided to the output terminal. In other words, the SP3T switch 121 connects the second antenna 12 to the first output terminal through the first output path and second band amplifier 122.

In the second band frequency reception bypass mode and the second band frequency transmission mode, the SP3T switch 121 connects the second output path 123 to the input path. Therefore, in a case in which the second output path 123 is activated, the reception signals bypass the second band amplifier 122 without being amplified and are output to the output terminal, or the transmission signals are output to the antenna. In other words, the SP3T switch 121 connects the second antenna 12 to the first output terminal through the second output path 123.

In the near field transmission and reception mode, the SP3T switch 121 connects the third output path 124 to the input path. Therefore, in a case in which the third output path 124 is activated, the signals are transmitted and received in a near field wireless communications scheme (for example, Bluetooth). In other words, the SP3T switch 121 connects the second antenna 12 to the second output terminal through the third output path 124.

Figure 4:
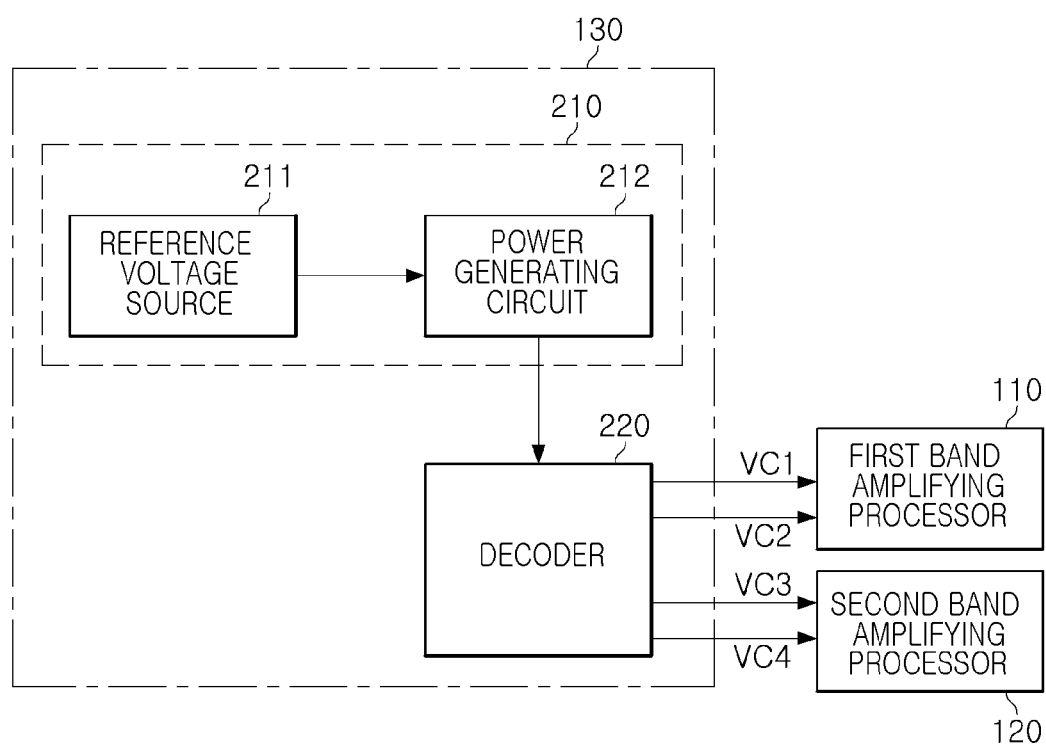
FIG. 4 is a block diagram illustrating an example of a controller illustrated in FIG. 1.

FIG. 4 is a block diagram illustrating an example of a controller illustrated in FIG. 1.

Referring to FIG. 4, the controller 130 includes a power supply circuit 210 and a decoder 220. The power supply circuit 210 provide constant voltage. The power supply circuit 210 includes a reference voltage source 211 and a power generating circuit 212. The reference voltage source 211 generates a reference voltage. The power generating circuit 212 generates a constant voltage using the reference voltage generated in the reference voltage source 211.

The decoder 220 uses the constant voltage to generate first, second, third and fourth control voltages VC1 through VC4. The decoder 220 outputs the first and second voltages VC1 and VC2 to the first band amplifying processor 110 and outputs the third and fourth control voltages VC3 and VC4 to the second band amplifying processor 120. Therefore, each of the first and second band amplifying processors 110 and 120 are switched using only two control terminals.

The decoder 220 simultaneously provides the first and second control voltages VC1 and VC2 to the first amplifying processor 110 and the third and fourth control voltages VC3 and VC4 to the second band amplifying processor 120. For instance, since the first and second band amplifying processors 110 and 120 use separate control voltages, even in a case in which the first and second band amplifying processors 110 and 120 are simultaneously driven, the number of control voltages does not need to be separately added.

Figure 5:
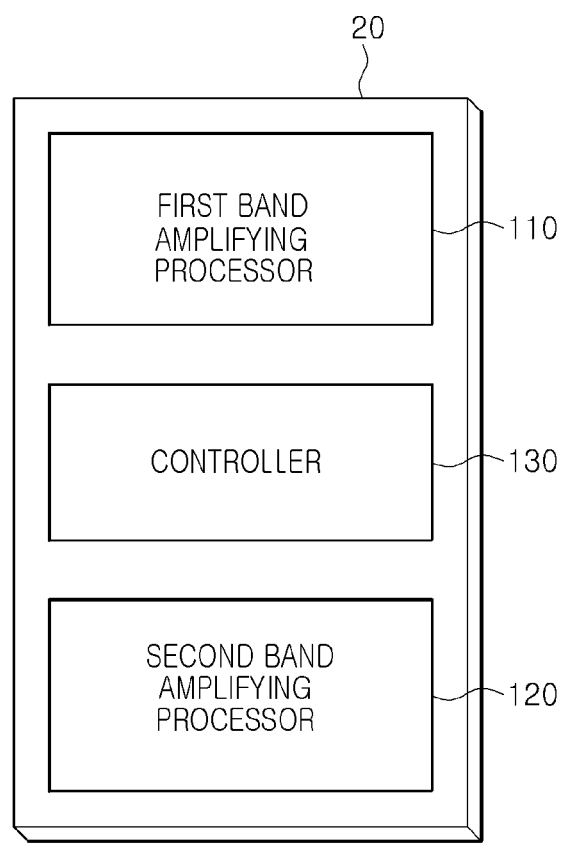
FIG. 5 is a block diagram illustrating another example of a front end module.

FIG. 5 illustrates a front end module configured as a single module on a single board.

Referring to FIG. 5, the front end module 100 further includes a main board 20 having a rectangular shape. A first band amplifying processor 110, a second band amplifying processor 120, and a controller 130 are mounted on one surface of the main board 20. The first band amplifying processor 110 is disposed in a first region on one surface of the main board 20, and the second band amplifying processor 120 is disposed in a second region on one surface of the main board 20. The controller 130 is disposed in a third region on one surface of the main board 20. The first and second regions are separated from each other by the third region. Therefore, interference between the first and second band amplifying processors 110 and 120 is suppressed, and the controller 130 easily outputs control voltages to the first and second band amplifying processors 110 and 120.

As set forth above, front end processing may be performed on a plurality of frequencies using a significantly reduced number of control voltages. Two frequency bands may be simultaneously processed.

The apparatuses, units, modules, devices, and other components illustrated in FIGS. 1-5 that perform the operations described herein with respect to FIGS. 1-5 are implemented by hardware components. Examples of hardware components include controllers, amplifiers, switches, sensors, generators, drivers, memories, comparators, arithmetic logic units, adders, subtractors, multipliers, dividers, integrators, and any other electronic components known to one of ordinary skill in the art. In one example, the hardware components are implemented by computing hardware, for example, by one or more processors or computers. A processor or computer is implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices known to one of ordinary skill in the art that is capable of responding to and executing instructions in a defined manner to achieve a desired result. In one example, a processor or computer includes, or is connected to, one or more memories storing instructions or software that are executed by the processor or computer. Hardware components implemented by a processor or computer execute instructions or software, such as an operating system (OS) and one or more software applications that run on the OS, to perform the operations described herein with respect to FIGS. 1-5. The hardware components also access, manipulate, process, create, and store data in response to execution of the instructions or software. For simplicity, the singular term "processor" or "computer" may be used in the description of the examples described herein, but in other examples multiple processors or computers are used, or a processor or computer includes multiple processing elements, or multiple types of processing elements, or both. In one example, a hardware component includes multiple processors, and in another example, a hardware component includes a processor and a controller. A hardware component has any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

Instructions or software to control a processor or computer to implement the hardware components and perform methods as described above are written as computer programs, code segments, instructions or any combination thereof, for individually or collectively instructing or configuring the processor or computer to operate as a machine or special-purpose computer to perform the operations performed by the hardware components and the methods as described above. In one example, the instructions or software include machine code that is directly executed by the processor or computer, such as machine code produced by a compiler. In another example, the instructions or software include higher-level code that is executed by the processor or computer using an interpreter. Programmers of ordinary skill in the art can readily write the instructions or software based on the block diagrams and the flow charts illustrated in the drawings and the corresponding descriptions in the specification, which disclose algorithms for performing the operations performed by the hardware components and the methods as described above.

The instructions or software to control a processor or computer to implement the hardware components and perform the methods as described above, and any associated data, data files, and data structures, are recorded, stored, or fixed in or on one or more non-transitory computer-readable storage media. Examples of a non-transitory computer-readable storage medium include read-only memory (ROM), random-access memory (RAM), flash memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, magnetic tapes, floppy disks, magneto-optical data storage devices, optical data storage devices, hard disks, solid-state disks, and any device known to one of ordinary skill in the art that is capable of storing the instructions or software and any associated data, data files, and data structures in a non-transitory manner and providing the instructions or software and any associated data, data files, and data structures to a processor or computer so that the processor or computer can execute the instructions. In one example, the instructions or software and any associated data, data files, and data structures are distributed over network-coupled computer systems so that the instructions and software and any associated data, data files, and data structures are stored, accessed, and executed in a distributed fashion by the processor or computer.

As a non-exhaustive example only, a terminal or electric device as described herein may be a mobile device, such as a cellular phone, a smart phone, a wearable smart device (such as a ring, a watch, a pair of glasses, a bracelet, an ankle bracelet, a belt, a necklace, an earring, a headband, a helmet, or a device embedded in clothing), a portable personal computer (PC) (such as a laptop, a notebook, a subnotebook, a netbook, or an ultra-mobile PC (UMPC), a tablet PC (tablet), a phablet, a personal digital assistant (PDA), a digital camera, a portable game console, an MP3 player, a portable/personal multimedia player (PMP), a handheld e-book, a global positioning system (GPS) navigation device, or a sensor, or a stationary device, such as a desktop PC, a high-definition television (HDTV), a DVD player, a Blu-ray player, a set-top box, or a home appliance, or any other mobile or stationary device capable of wireless or network communication. In one example, a wearable device is a device that is designed to be mountable directly on the body of the user, such as a pair of glasses or a bracelet. In another example, a wearable device is any device that is mounted on the body of the user using an attaching device, such as a smart phone or a tablet attached to the arm of a user using an armband, or hung around the neck of the user using a lanyard.

A terminal as described herein, which may be referred to as a computer terminal, may be an electronic or electromechanical hardware device that is used for entering data into and displaying data received from a host computer or a host computing system. A terminal may be limited to inputting and displaying data, or may also have the capability of processing data as well. A terminal with a significant local programmable data processing capability may be referred to as a smart terminal or fat client. A terminal that depends on the host computer or host computing system for its processing power may be referred to as a dumb terminal or thin client. A computer may run terminal emulator software that replicates the function of a terminal, sometimes allowing concurrent use of local programs and access to a distant terminal host system.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A front end module comprising:
   a first band amplifying processor configured to selectively amplify and bypass signals in a first frequency band;
   a second band amplifying processor configured to selectively amplify and bypass signals in a second frequency band; and
   a controller comprising
   a power supply circuit configured to output constant voltage; and
   a decoder configured to output, using the constant voltage, first and second control voltages to the first band amplifying processor and third and fourth control voltages to the second band amplifying processors to control modes of the first and second band amplifying processors.

2. The front end module of claim 1, wherein the controller adjusts a mode of the first band amplifying processor using the first and second control voltages.

3. The front end module of claim 2, wherein the modes of the first band amplifying processor comprise a first band frequency reception mode, a first band frequency reception bypass mode, and a first band frequency transmission mode.

4. The front end module of claim 1, wherein the modes of the second band amplifying processor comprise a second band frequency reception mode, a second band frequency reception bypass mode, a second band frequency transmission mode, a second band near field transmission mode and a second band near field reception mode.

5. The front end module of claim 1, wherein the controller is configured to simultaneously output the first and second control voltages to the first amplifying processor and the third and fourth control voltages to the second band amplifying processor.

6. The front end module of claim 1, wherein the power supply circuit comprises:
a reference voltage source configured to generate a reference voltage; and
a power generating circuit configured to generate the constant voltage using the reference voltage.

7. The front end module of claim 1, wherein the first band amplifying processor comprises:
a single-pole double-throw switch configured to receive the control voltage and connect one of a first output path or a second output path to an input path according to the control voltage; and
an amplifier disposed on the first output path of the single-pole double-throw switch, wherein the second output path is a bypass path omitting amplification.

8. The front end module of claim 7, wherein the single-pole double-throw switch is configured to connect the first output path to the input path in a first band frequency reception mode.

9. The front end module of claim 8, wherein the single-pole double-throw switch is configured to connect the second output path to the input path in a first band frequency reception bypass mode and in a first band frequency transmission mode.

10. The front end module of claim 7, wherein the input path is connected to a first antenna configured to operate in the first frequency band.

11. The front end module of claim 1, further comprising a main board having a rectangular shape,
wherein the first band amplifying processor is disposed on one surface of the main board in a first region,
the second band amplifying processor is disposed on the one surface of the main board in a second region,
the controller is disposed on the one surface of the main board in a third region, and
the first and second regions are separated from each other by the third region.

12. The front end module of claim 11, wherein the first and second regions are separated from each other a distance suitable to substantially avoid noise between the first and second band amplifying processors.

13. The front end module of claim 1, wherein the controller is configured to operate the first and second band amplifying processors in substantially simultaneous manner.

14. The front end module of claim 1, wherein the first and second band amplifying processors are coupled in parallel relation to the controller to reduce a number of discrete control voltages.

15. A front end module comprising:
a first band amplifying processor, connected to a first antenna, configured to selectively amplify and bypass first reception signals in a first frequency band received through the first antenna;
a second band amplifying processor, connected to a second antenna, configured to selectively amplify and bypass second reception signals in a second frequency band received through the second antenna; and
a controller comprising
a power supply circuit configured to output constant voltage; and,
a decoder configured to output, using the constant voltage, first and second control voltages to the first band amplifying processor, and third and fourth control voltages to the second band amplifying processors to control the first and second band amplifying processors.

16. The front end module of claim 15, wherein the first band amplifying processor is configured to transmit first transmission signals to the first antenna, and
the second band amplifying processor is configured to selectively transmit second transmission signals to the second antenna and perform near field wireless communications in the second frequency band.

17. The front end module of claim 16, wherein the controller is configured to generate the third and fourth control voltages to selectively execute amplification and bypass of the second reception signals, transmission of the second transmission signals, and near field wireless communications in the second frequency band of the second band amplifying processor.

18. The front end module of claim 17, wherein the controller is configured to simultaneously generate the third and fourth control voltages.

19. The front end module of claim 16, wherein the controller is configured to generate the first and second control voltages to selectively execute amplification and bypass of the first reception signals and transmission of the first transmission signals of the first band amplifying processor.

20. The front end module of claim 19, wherein the controller is configured to simultaneously generate the first and second control voltages.

21. The front end module of claim 15, wherein the first band amplifying processor comprises:
a single-pole double-throw switch comprising one input path, two output paths, and a switch connecting the input path to one of the two output paths; and
an amplifier disposed on one of the two output paths of the single-pole double-throw switch and the other of the two output paths is a bypass path omitting amplification,
wherein the one input path is connected to the first antenna.

22. A front end module comprising:
a first band amplifying processor configured to amplify signals in a first frequency band;
a second band amplifying processor configured to amplify signals in a second frequency band; and
a controller configured to output separate control voltages to the first and second band amplifying processors to control modes of the first and second band amplifying processors, the controller comprising:

a power supply circuit configured to output constant voltage; and a decoder configured to generate first and second control voltages provided to the first band amplifying processor and third and fourth control voltages provided to the second band amplifying processor using the constant voltage, wherein the power supply circuit comprises:

a reference voltage source configured to generate a reference voltage; and a power generating circuit configured to generate the constant voltage using the reference voltage.

23. A front end module comprising:

a first band amplifying processor, connected to a first antenna, configured to amplify or bypass first reception signals in a first frequency band received through the first antenna;

a second band amplifying processor, connected to a second antenna, configured to amplify or bypass second reception signals in a second frequency band received through the second antenna; and a controller configured to output separate control voltages to the first and second band amplifying processors to control the first and second band amplifying processors, wherein the first band amplifying processor is configured to transmit first transmission signals to the first antenna, the second band amplifying processor is configured to selectively: transmit second transmission signals to the second antenna, and to perform near field wireless communications in the second frequency band, and wherein the controller is configured to generate third and fourth control voltages to distinguish amplification and bypass of the second reception signals, transmission of the second transmission signals, and near field wireless communications in the second frequency band of the second band amplifying processor from each other.

* * * * *